No. 834,635. PATENTED OCT. 30, 1906.
C. OLSON.
SPRING HINGE.
APPLICATION FILED JUNE 13, 1905.
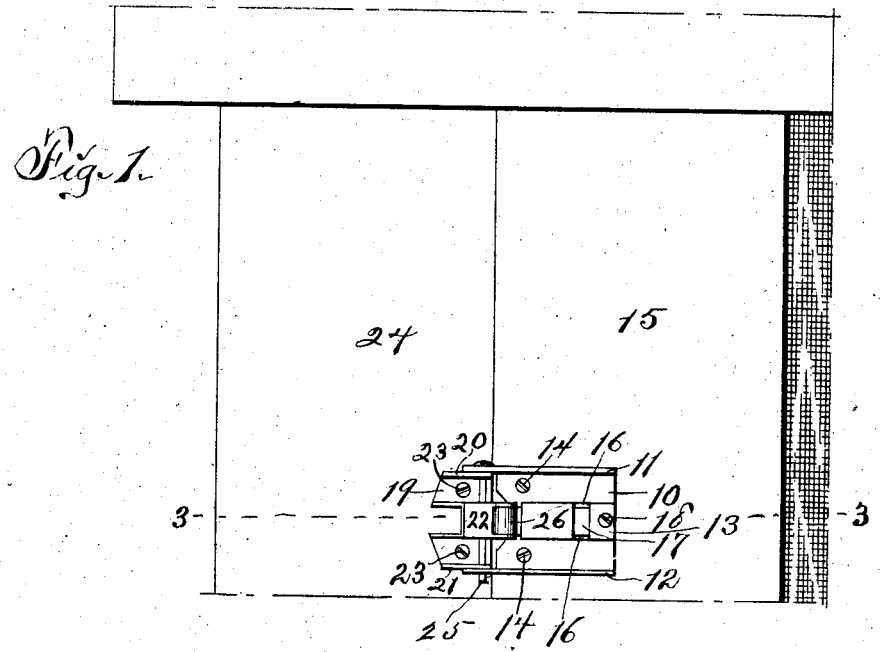
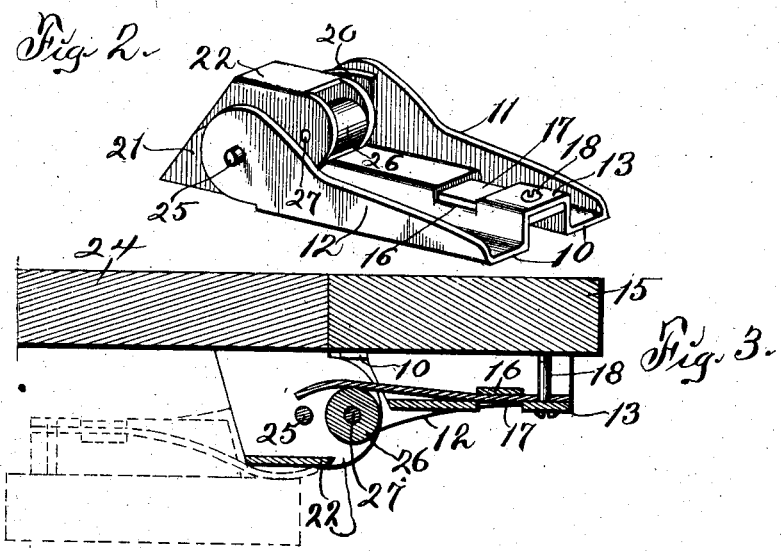
Attest:
L. H. Heibrock.
W. E. Ellis.
Inventor:
Charles Olson,
By H. Sweet Atty

UNITED STATES PATENT OFFICE.

CHARLES OLSON, OF DES MOINES, IOWA, ASSIGNOR TO UNITED STATES PATENT BROKERAGE COMPANY, OF DES MOINES, IOWA, A CORPORATION OF IOWA.

SPRING-HINGE.

No. 834,635.　　　Specification of Letters Patent.　　　Patented Oct. 30, 1906.

Application filed June 13, 1905. Serial No. 265,623.

*To all whom it may concern:*

Be it known that I, CHARLES OLSON, a citizen of the United States of America, and a resident of Des Moines, Polk county, Iowa, have invented a new and useful Spring-Hinge, of which the following is a specification.

The object of this invention is to provide an improved construction for spring-hinges.

My invention consists in the construction, arrangement, and combinaton of elements hereinafter set forth, pointed out in my claims, and illustrated by the accompanying drawings, in which—

Figure 1 is an elevation illustrating my improved device mounted as required for practical use. Fig. 2 is a perspective of my improved hinge. Fig. 3 is a horizontal section on the indicated line 3 3 of Fig. 1.

In the construction of the device as shown one hinge member is formed of a plate 10, formed with parallel marginal vertically-disposed flanges 11 12 and a plane-faced housing portion or plate 13 between and parallel with said flanges. The plate 10, with its flanges and housing, is made from one piece of sheet metal and is shaped and formed to produce the flanges and housing by stamping. The plate 10 also is formed with holes between the flanges and housing to receive screws 14, whereby the plate may be secured to a support, such as a door 15. Portions of the housing 13 are struck inward from the face thereof to form lugs 16, and a leaf-spring 17 is mounted between said lugs and the face portion of the housing and is held in place by a screw 18. The screw 18 extends through a hole in the housing 13 and a hole in the outer end portion of the leaf-spring 17 and is seated in the support 15. The inner end portion of the leaf-spring 17 is turned outwardly, as shown in Fig. 3. Another hinge member is formed from a plate 19, formed with marginal flanges 20 21 and a housing 22 between and parallel with said flanges. The plate 19, with its flanges and housing, is made from one piece of sheet metal and is shaped and formed to produce the flanges and housing by stamping. The plate 19 also is formed with holes between the flanges and housing thereof to receive screws 23, whereby the second hinge member may be secured to a support, such as a door-casing 24. The flanges 20 21 of one hinge member are located within or between the flanges 11 12 of the other hinge member and in contact therewith, and a hinge-pin 25 is mounted loosely in coinciding apertures in said flanges and serves to pivotally connect the hinge members. A bearing device is provided, in this instance constructed with a roller 26, mounted for rotation on a pin 27, mounted in the walls of the housing 22, said roller being wholly between said walls. The roller 26 is of such diameter and its axle 27 is in such relation between the hinge-pin 25 and the housing 13 that said roller normally bears on and presses the leaf-spring 17 inwardly, thus deflecting said spring from a plane and storing power therein which resists flexure of the hinge members relative to each other. Any movement of the hinge member 10, such as would be occasioned by opening the door 15, increases the flexure, and consequently the force, of the leaf-spring 17, thus providing means for closing said door automatically and holding it closed by yielding pressure. When the door is turned into a plane parallel with the casing 24, however, the hinge member 10 carries the leaf-spring 17 out of contact with the bearing device or roller 26 and into contact with the front face of the housing 22, dotted lines, Fig. 3. The front of the housing 22 serves as a releasing means inasmuch as in the open position of the hinge the spring 17 is flexed further and out of contact with the bearing device by said housing and exerts its force in holding the door 15 in extreme open position. Upon the partial closing of the door by manual force, and when the concaved face of the spring 17 is again in contact with the roller, being guided thereto by sliding engagement with the front face of the housing 22, said spring again exerts its force to close the door completely.

I claim as my invention—

1. A spring-hinge, comprising hinge members pivoted together, a spring on one member, and a roller on the other member adapted to be engaged by said spring during a predetermined movement of the member carrying said spring, the roller-carrying member formed with a plane-faced portion adjacent said roller arranged and adapted to engage and release said spring from the roller.

2. A spring-hinge, comprising hinge members, a hinge-pin pivotally connecting said hinge members, a roller on one of said hinge members, and a leaf-spring on the other hinge member normally engaging said roller, the roller-carrying member formed with a housing adjacent said roller constructed to be engaged by and to disengage said spring from said roller.

3. A spring-hinge, comprising hinge members, a loose hinge-pin pivotally connecting said hinge members, a bearing device on one member, and a spring on the other member constructed to engage said bearing device during a predetermined movement of the member carrying said spring, the latter said member formed with a plane-faced housing adjacent said bearing device, said housing constructed to be engaged by and to disengage said spring from said bearing device.

4. A spring-hinge, comprising a member formed with a housing and lugs on said housing, a leaf-spring in said housing and engaging said lugs, another member pivoted to the first member, and a roller on the second member, said spring constructed and arranged to engage said roller during a predetermined movement of the hinge member carrying said spring, the roller-carrying member formed with a plane-faced plate adjacent said roller and adapted to engage said spring in a further predetermined movement of the spring-carrying member and release said spring from the roller.

5. A spring-hinge, comprising a member formed with flanges and a housing between said flanges, a leaf-spring mounted in said housing, another member formed with flanges and a housing between said flanges, the latter flanges pivoted to the first flanges, and a roller in the latter housing, said spring constructed to engage said roller during a predetermined movement of the hinge member carrying said spring.

6. A spring-hinge, comprising members pivoted together, a leaf-spring on one member and formed with a curved end portion, and a roller on the other member arranged and adapted to be engaged by the curved end portion of the leaf-spring during a predetermined movement of the member carrying said spring, the roller-carrying member formed with a plane-faced plate adjacent said roller and adapted to engage said spring in a further movement of the spring-carrying member and release said spring from the roller.

Signed by me at Des Moines, Iowa, this 3d day of May, 1905.

CHARLES OLSON.

Witnesses:
S. C. SWEET,
L. L. LEIBROCK.